(12) United States Patent
Klevana et al.

(10) Patent No.: US 7,766,359 B2
(45) Date of Patent: Aug. 3, 2010

(54) TRAILER/JOGGER COMBINATION

(76) Inventors: Leighton Klevana, 8913 Brieryle Rd., Richmond, VA (US) 23229; David Boardman, 208 Westham Pkwy., Richmond, VA (US) 23229

( * ) Notice: Subject to any disclaimer, the term of this patent is extended or adjusted under 35 U.S.C. 154(b) by 11 days.

(21) Appl. No.: 11/904,544

(22) Filed: Sep. 27, 2007

(65) Prior Publication Data

US 2008/0143076 A1 Jun. 19, 2008

Related U.S. Application Data

(60) Provisional application No. 60/827,184, filed on Sep. 27, 2006.

(51) Int. Cl.
 *B62K 27/00* (2006.01)
(52) U.S. Cl. ........................ 280/204; 280/648
(58) Field of Classification Search ................ 280/204, 280/292, 648, 656, 657
 See application file for complete search history.

(56) References Cited

U.S. PATENT DOCUMENTS

| | | | | |
|---|---|---|---|---|
| 5,076,599 A | * | 12/1991 | Lockett et al. | 280/204 |
| 5,267,744 A | * | 12/1993 | Berry et al. | 280/204 |
| 5,301,963 A | * | 4/1994 | Chen | 280/30 |
| 5,308,096 A | * | 5/1994 | Smith | 280/204 |
| 6,705,628 B2 | * | 3/2004 | Kahmann | 280/204 |
| 2006/0273555 A1 | * | 12/2006 | Morgan et al. | 280/656 |
| 2008/0067776 A1 | * | 3/2008 | Britton | 280/204 |

OTHER PUBLICATIONS

Solvit Products, LP, Track'r Pet Bicycle Trailer Care & Use Guide, Mansfield, Texas USA.
Burley, Owner's Instruction and Safety Manual, Child Trailer, Aug. 2008, Eugene, Oregon, USA.

* cited by examiner

*Primary Examiner*—Tony H. Winner
(74) *Attorney, Agent, or Firm*—Bernard G. Pike; Troutman Sanders LLP

(57) ABSTRACT

A combination stroller/jogger configured to be converted from a stroller or jogger to a bicycle trailer and then reconfigured for use as a stroller or jogger. The product can be interchanged between a bike trailer and a stroller/jogger and vice versa without the need for a conversion kit, as all of the necessary components are built into the unit.

18 Claims, 11 Drawing Sheets

TRAILER/JOGGER COMBINATION

RELATED APPLICATIONS

This application claims priority to U.S. Provisional Patent Application No. 60/827,184 filed on Sep. 27, 2006.

FIELD OF THE INVENTION

The present invention relates to strollers and trailers, and more particularly, to all-terrain strollers, strollers for use while jogging, trailers for pulling a child behind a vehicle, and a single product can be used alternatively as a stroller and a trailer.

BACKGROUND

Strollers designed for use while running or jogging are popular with parents that wish to take their young children with them while participating in sports. All terrain strollers and jogging strollers (hereinafter "stroller/joggers") allow more flexibility for parents allowing them to take their children with them to places that ordinarily strollers could not be easily or safely maneuvered.

Similarly, trailers for pulling children behind bicycles allow parents to take their children with them on bicycle rides for exercise, recreation, or running errands. Trailers typically will have seats comprising seat belts and other safety devices that allow bicyclists to safely take their young children with them.

In recent years, several manufacturers have attempted to design a stroller that could be easily converted to a trailer. Such a product (hereinafter "trailer/jogger") would allow parents that would like to take their children with them for both running or jogging and bicycling to purchase only one product. This would reduce both cost and storage space required for the parents.

Several manufacturers have designed conversion kits for their strollers that allow the stroller to be modified to be pulled by a bicycle. Such conversion kits require removal of components of the frame of the stroller and replacing them with trailer components such as a tow bar. The removed components must be stored and replaced when converting the trailer back to a stroller. Such conversion kits are thus inconvenient and converting them is time consuming and requires tools.

There is a need for a trailer/jogger comprising both a tow bar and a wheel attachment member attached to the frame. There is also a need for a trailer/jogger comprising a tow bar that is capable of being switched from a stored position to an in-use position and a wheel attachment made that is also capable of being switched from an in-use position to a stored position.

SUMMARY

The invention is directed to a strollers or carts and trailers. Specific embodiments are directed to all-terrain strollers, strollers for use while jogging, trailers for pulling a child behind a vehicle, and a single product can be used alternatively as a stroller and a trailer. Further embodiments are directed to a stroller comprising a front fork attached to a frame and a tow bar attached to the frame. The front forks and the tow bar may be rotatably connected to the frame so they may be moved from a stored position to an in-use position, if desired. In embodiments, the front forks and the tow bar may be permanently connected to the frame.

An embodiment is also a method of converting a stroller to a trailer comprising: removing a wheel, rotating two front forks underneath the frame, and rotating a tow bar from underneath the frame.

Other features and advantages of the invention will become apparent from the following detailed description, taken in conjunction with the accompanying drawings.

DETAILED DESCRIPTION OF THE INVENTION

Figure 1A:
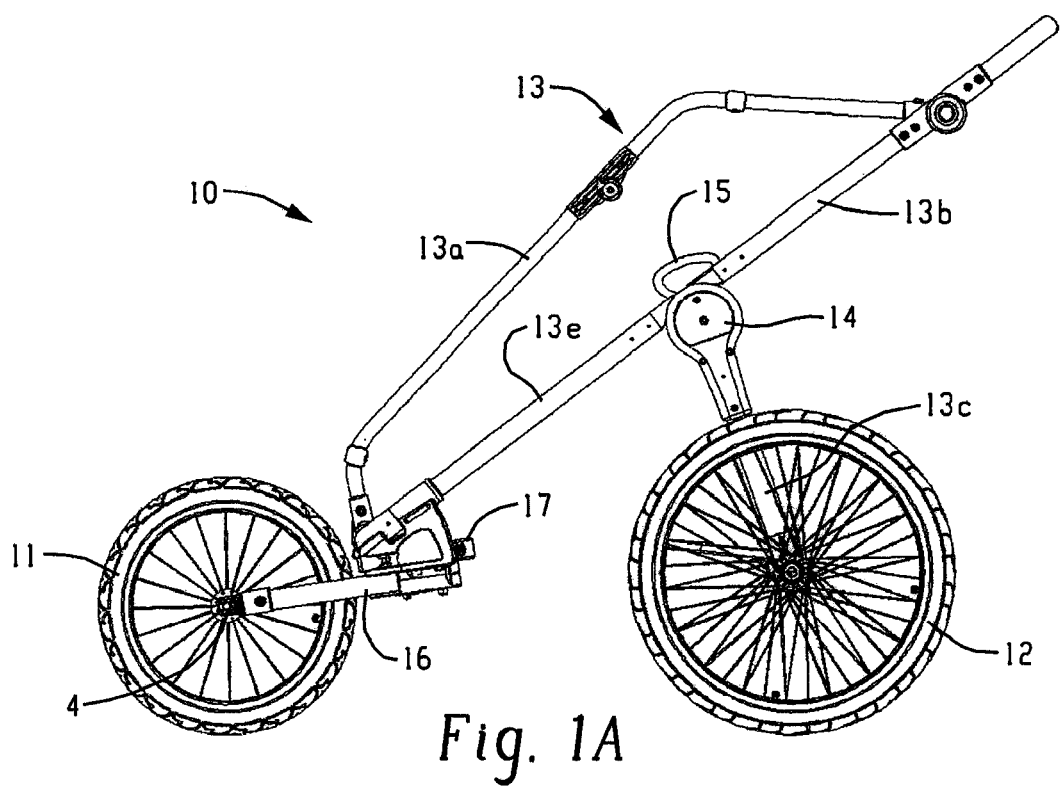
FIG. 1A is a side view of an embodiment of the trailer/jogger combination in the jogger configuration.

The present invention is directed to a stroller, all-terrain stroller, or jogging stroller and trailer combination (hereinafter "trailer/jogger" or "trailer/jogger combination"). The trailer/jogger combination may be interchanged between a trailer configuration such as a bicycle trailer configuration and a stroller/jogger configuration. Embodiments of the trailer/jogger of the present invention do not require a separate conversion kit, because the components are built into the unit. Therefore, the present invention can be used as a bicycle trailer or a stroller/jogger at any time without the need to add or remove a tow bar or a wheel attachment member such as a fork to the frame.

In the trailer configuration, the trailer/jogger combination may be pulled behind a vehicle such as a bicycle. Children or other loads may be transported in the trailer pulled behind a bicycle. Trailers typically comprise a tow bar that is attached to a portion of a bicycle, typically trailers are attached to the rear axle or seat stem of the bicycle, but may be attached to other portions of the bicycle. It should be noted that though the examples and description are directed toward a trailer/jogger that allows one to convert a stroller for pushing children to a trailer for pulling children behind a bicycle, embodiments of the trailer/jogger combination may also be used for a trailer/cart combination, wherein a trailer for carrying a load such as camping equipment behind a bicycle may be converted to a cart for moving the load by hand. A trailer for a bicycle that converts to a cart may be useful for long distance bicycle trips or bicycle camping trips, for example, wherein gear may be pulled behind a bicycle then converted to a cart to be pulled around a camp site or to a hotel room after being detached from the bicycle. Additionally, embodiments of the present invention may include a trailer for pulling a golf bag behind a golf cart that may be converted to a golf bag cart, for example.

In one embodiment the present invention is directed to a trailer/jogger combination comprising a front fork attached to a frame and a tow bar attached to the frame. Since the front fork and the tow bar are both attached to the frame, the conversion of the trailer to a stroller is convenient. Preferably, the front fork may be rotatably connected to the frame. In this embodiment, the front fork may be rotated from an in-use position to a stored position depending on the desired configured mode of the trailer/jogger combination. In one embodiment, the front fork may be rotated from an in-use position to a stored position by disengaging a locking mechanism, for example. In one embodiment, the trailer/jogger combination comprises two front forks that are connected together to lock them in the in-use position and may be independently rotated underneath the frame where at least a portion of the fork is engaged in a recess to hold the front fork in the stored position. In the engaged position, any locking mechanism that is capable of preventing substantial movement of the front forks so the trailer/jogger may remain in the desired configuration during use may be used. In embodiments of the invention, the front wheel of the jogger/stroller configuration may be removed to convert to the trailer configuration. However, this is not necessary in all embodiments, the front fork may be attached by a ball joint, for example, that allows the front wheel to be rotated to a horizontal position and then rotated to a stored position under the frame.

The stored position of the front fork may be any position that does not significantly interfere with the operation of the trailer/jogger as a trailer. For example, the front fork may fold underneath the frame, outward along side a frame members, into any other position. The stored position in one configuration of the trailer/jogger may be used as a component of the other configuration, such that the tow bar may be converted to a handle for the jogger configuration or the front fork may be converted as an additional frame support for the trailer configuration. As used herein, a "stored position" means merely that the a component of that has a primary position for one configuration may be switched from that primary position to a secondary position in a second configuration of the trailer/jogger that does not interfere with the use of the trailer/jogger in the second configuration. The stored position, therefore, may not only be used to store the component but may in some way benefit the configuration of the trailer/jogger. The stored position may be any position in which the component remains attached to the frame or other portion of the article, but is in a different position than the position of the component when the component is in its primary in-use position.

The tow bar may also be rotatably secured to the frame. The tow bar tow bar may rotate or fold from an in-use position to a stored position similar to the front fork. A tow bar is a component that may be attached to a separate vehicle for towing the trailer. The separate vehicle may be, but not limited to, a bicycle, a tricycle, a golf cart, a lawn tractor, or other vehicle. Preferably when the tow bar is in the in-use position and the trailer is being towed, the front forks are in a stored position. For example, the front forks may be rotated to a position underneath the frame. In the stored position, the front fork or front forks do not substantially interfere with the use of the tow bar. The opposite is true for the tow bar in the jogger/stroller configuration. In certain embodiments, the tow bar is rotatably attached to the frame such that the tow bar may be rotated from an in-use position to a stored position.

Figure 1B:
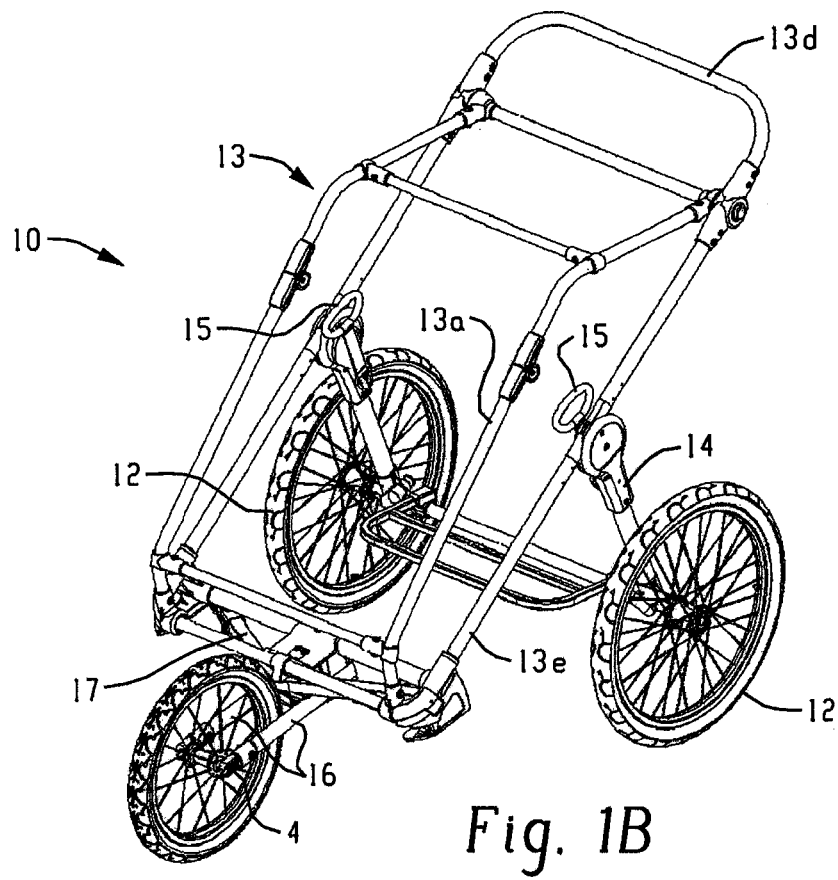
FIG. 1B is a perspective view of an embodiment of the trailer/jogger combination in the jogger configuration.

One embodiment of the trailer/jogger is shown in FIGS. 1A and 1B. The trailer/jogger 10 of FIGS. 1A and 1B is in the stroller configuration wherein the trailer/jogger comprises both front wheel 11 and back wheels 12. The trailer/jogger comprises a frame 13 comprising primary frame components 13a, 3b, 13c, and 13e as shown in FIG. 1A, complementary components may be seen in FIGS. 1B, 2B and FIGS. 3 to 8. Locking mechanism 14 connects frame component 13c with 13b and 13e. Locking mechanism 14 locks trailer/jogger 10 in an unfolded as shown in FIG. 9 or in-use position as shown in FIGS. 1A to 2B. Release mechanism 15 facilitates unlocking of locking mechanism 14 and allows folding of the trailer/jogger 10 for ease of storing or transporting the trailer/jogger 10.

More specific to the embodiment shown in FIGS. 1A, 1B, 2A and 2B, trailer/jogger 10 comprises two front forks 16 and a tow bar 17. The embodiment of the trailer/jogger comprises two front forks, however, a trailer/jogger may comprise only one front fork, if desired. A trailer/jogger comprising two front forks will typically provide more support for the front wheel, however, there may be advantages to having only one front fork. For example, the trailer/jogger with only one fork may be lighter, require less steps to convert to a trailer or stroller, and may more easily allow for conversion to a trailer by storing the fork and the front wheel under the frame.

In the trailer/jogger of FIG. 1A, the front forks 16 and the tow bar 17 of trailer/jogger 10 are rotatably connected to the frame 13. The front forks 16 are in the in-use position and are connected to front wheel 11. The tow bar 17 is in the stored position underneath frame 13. The tow bar 17 of the embodiment of the trailer/jogger 10 is rotatably connected to the frame 13 such that tow bar 17 may be stored under frame 13, however, in other embodiments of the trailer/jogger the tow bar or the front fork may be rotated from an in-use position to a stored in position in other locations. For example, the tow bar or front fork may rotate vertically and thus may be rotated to a stored position along another frame member, such as, but not limited to, either frame member 13a. It is also possible that a tow bar or front fork may be incorporated that is jointed so the tow bar may be folded to a smaller length and moved to a stored position. In addition, a tow bar or front fork may be used that is slidingly connected to the frame so the tow bar may be slid forward along a frame member for example, into an in-use position and slid back along a frame member, such as frame member 13b or underneath the frame 13 to a stored position. Other connections may also be used such as ball joint connections that allow rotation along around two axes, telescoping connections that allow lengthening the tow bar for use and shortening the tow bar for storage, as well as other connections.

Figure 2A:
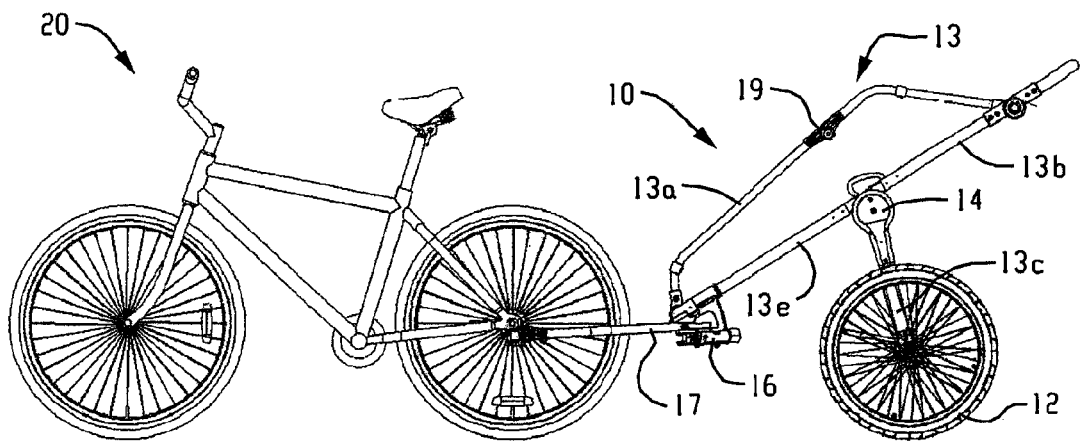
FIG. 2A is a side view of an embodiment of the trailer/jogger combination in the trailer configuration and attached to a bicycle.
Figure 2B:
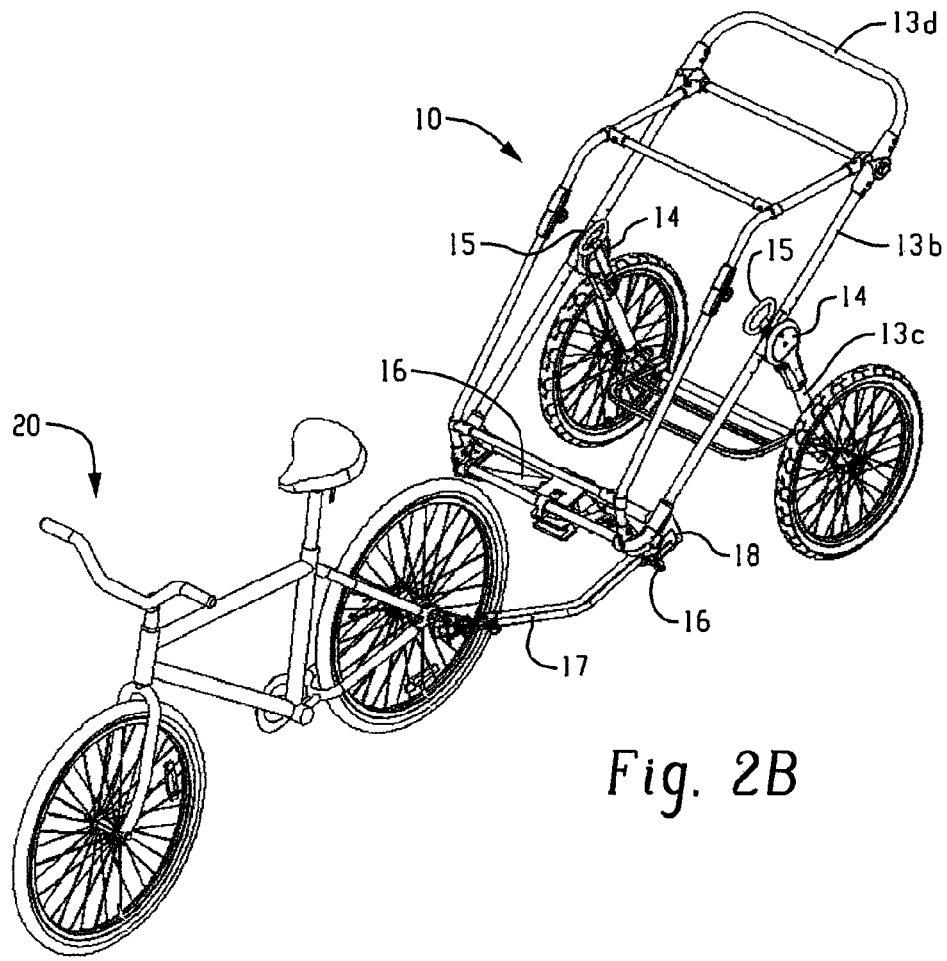
FIG. 2B is a perspective view of an embodiment of the trailer/jogger combination in the trailer configuration and attached to a bicycle.

In FIGS. 2A and 2B, trailer/jogger combination 10 is in the trailer configuration and is shown connected to bicycle 20. The front forks 16 and the tow bar 17 of trailer/jogger 10 are rotatably and permanently connected to the frame 13. Connector 18 on frame 13 comprises both a rotable connection with the tow bar 17 and locks front fork 16 in the stored position. In the trailer configuration, the front forks 16 are in the stored position underneath the frame 13 and the tow bar 17 is in the in-use position, shown connecting the trailer/jogger to the rear axle of bicycle 20. In the embodiment of the trailer/jogger 10 shown in FIGS. 2A and 2B, the front wheel has been removed prior to rotation of the front forks 16 into their stored position under frame 13.

More specifically, the embodiment shown in FIGS. 1A, 1B, 2A and 2B is a typical trailer/jogger, having a foldable, tubular metal frame 13 and a transversely extending rear axle assembly comprising a non-rotating rear axle. Left and right side rear wheels 12 are rotatably mounted to the ends of the rear axle assembly. The forward end of the frame 13 has a single front wheel 11 rotatably mounted thereto in the jogger configuration. Though the embodiment shown has only one front wheel, an embodiment of a jogger with multiple front wheels may be designed and is within the scope of the invention.

The frame 13 of the trailer/jogger configuration has no base frame members extending rearwardly from the front wheel 11 to the rear axle assembly. The frame 13 comprises left and right side, downwardly and forwardly sloping front wheels frame members or supports 13, which each extend downward from a corresponding one of left and right side folding assemblies 14. Wheel attachment members or front forks 16 have front wheel connectors 4 fixedly attached thereto and a corresponding end of an axle of the front wheel 16 removably attached thereto to mount the front wheel to the stroller frame 13. The front forks 16 are connected by connector 31 (see FIG. 3) that is fixedly attached to frame 13.

The frame 13 also includes left and right side, upwardly and rearwardly sloping handle frame members or supports 13b, which each extend upward from the corresponding one of the left and right side folding assemblies 14 in a generally parallel configuration to a handle 13d extending between the left and right side handle supports 13b. The handle 13d may be covered by a foam grip. The handle supports 13b are interconnected by the handle 13d that spans between them at their rearwardmost and uppermost extension and that is fixedly attached to each.

As a result of the interconnection provided by the handle 13d, the left and right side handle supports 13b may move as a unit with respect to the left and right side folding assemblies 14 upon folding and unfolding of the stroller 10, as will be described below. It is noted that in lieu of the interconnecting handle 13d, the handle supports 13b may each be provided with a handle portion at the upper end thereof such as used with umbrella style strollers.

In the embodiment of the trailer/stroller 10 the left and right side handle supports 13b and the handle 13d are formed as an integral unit by bending a single length of aluminum tube. The left and right side handle supports 13b are movable relative to the left and right side front wheel supports 13e for folding of the stroller 10. The left and right side handle supports 13d are also movable independent from movement of the left and right side front wheel supports 13e. The frame components 13a also comprise hinges 19 that facilitate folding the trailer/jogger combination to a more compact size. Frame components 13a may be used to support a cover for the trailer to protect child or other load from debris, rain, wind, sun exposure, or other elements.

The frame 13 also includes left and right side, downwardly and rearwardly sloping rear wheel frame members or supports 13c, which each extend downward from the corresponding one of the left and right side folding assemblies 14 in a generally parallel configuration to the rear axle assembly. A rearward free-end of each of the left and right side rear wheel supports 13c is fixedly attached to a corresponding one of the left and right ends of the tubular rear axle. The rear wheel supports 13c are interconnected by the rear axle assembly that spans between them at the rearward free-ends thereof. As a result of the interconnection provided by the rear axle assembly, the left and right side rear wheel supports 13c move as a unit with respect to the left and right folding assemblies 14 for folding and unfolding of the stroller 10, as will be described below, though such interconnection is not required in all embodiments. The left and right side rear wheel supports 13c are also movable relative to the left and right side front wheel supports 13e and the left and right side handle supports 13b for folding of the stroller 10.

In the illustrated embodiment of the stroller 10, the left and right side front wheel supports 13e, the left and right side handle supports 13b, and the left and right side rear wheel supports 13c are made from aluminum tube. Suitable alternative materials may be used.

Embodiments of the trailer/jogger combination may comprise a folding mechanism 14. In an embodiment with a folding mechanism 14, the trailer/jogger 10 may be folded to allow it to be transported or stored in a more compact size. Embodiments of the trailer/jogger may be in a folded position. In a preferred embodiment, the trailer/jogger may be opened from the folded position by pulling a handle 15 away from the front frame. Once opened, the trailer/jogger may be locked in the open position and the user may decide if they want to use the trailer/jogger as a stroller, jogger, or trailer.

Figure 3:
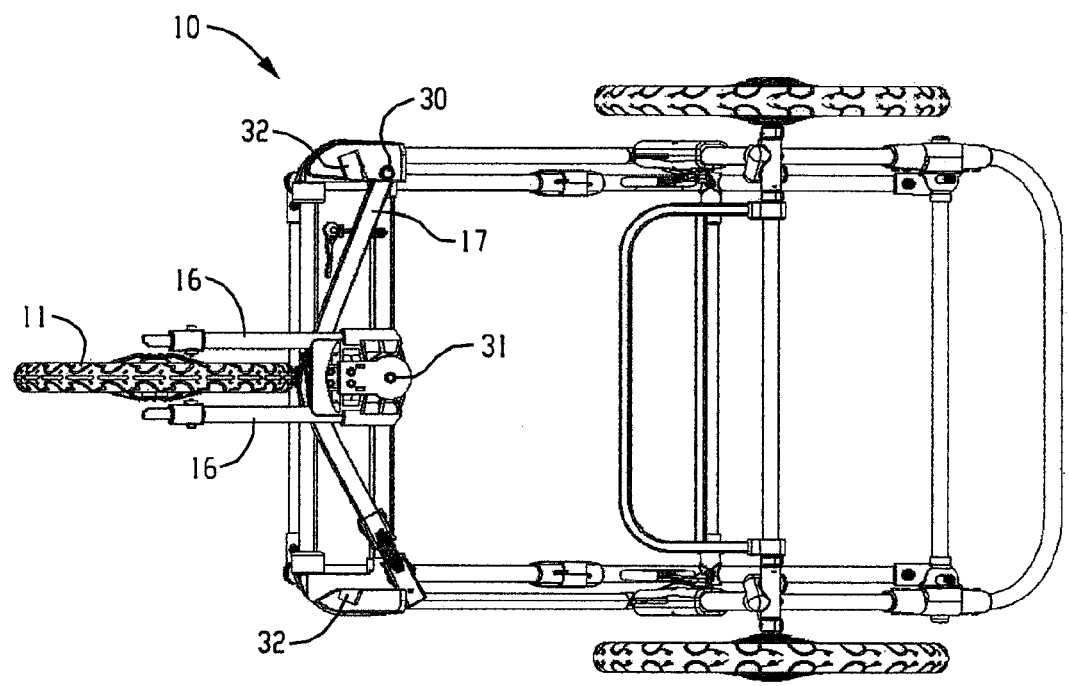
FIG. 3 is a bottom view of an embodiment of the trailer/jogger combination in the jogger configuration.
Figure 4:
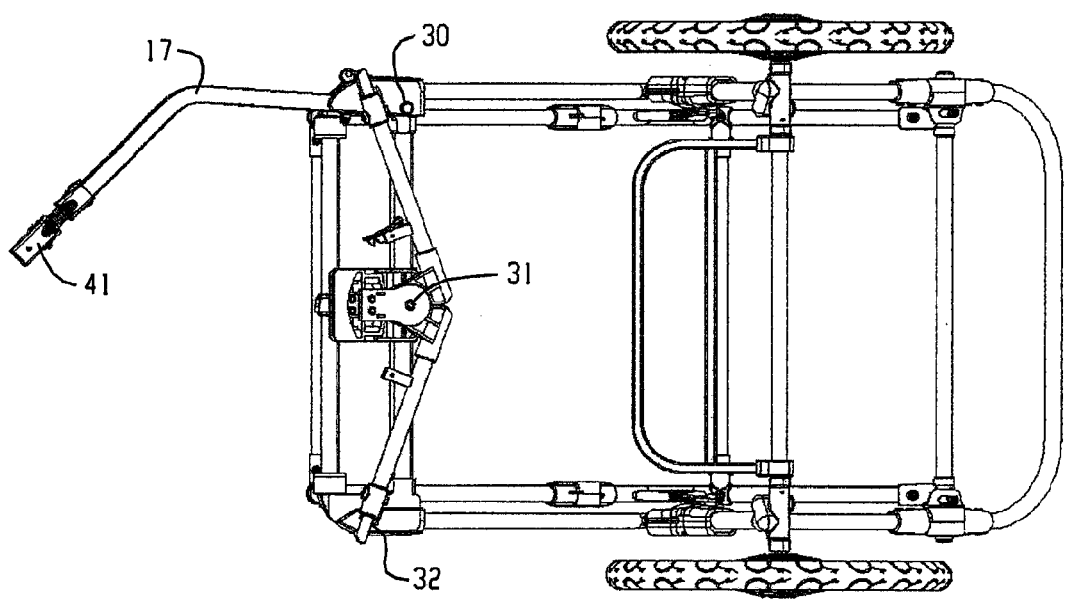
FIG. 4 is a bottom view of an embodiment of the trailer/jogger combination in the trailer configuration.

FIG. 3 shows a bottom view of the trailer/jogger 10 in the jogger configuration of FIG. 1A. Front forks 16 of trailer/jogger 10 are shown in the in-use position. Front forks are rotatably connected to the frame by connector 31. The front forks 16 may be rotated about connector 31 from the in-use position, as shown, to the stored position wherein the front forks 16 are held in the stored position by recess 32. As more easily seen in FIG. 3, tow bar 17 is in the stored position and is rotatably connected at connection point 30. FIG. 4 shows a bottom view of the trailer/jogger 10 in the trailer configuration of FIG. 2A. Front forks 16 of trailer/jogger 10 are shown in the stored position with the ends of front forks 16 in recesses 32. Tow bar 17 is in the in-use position and may be connected to a vehicle such as a bicycle by connector 41.

In certain embodiments, both the tow bar and the front fork may both be rotated to stored positions to allow the trailer/jogger to be more easily stored or transported. See FIG. 5. The stored position for either or both of the tow bar and the front fork may be underneath the frame of the trailer/jogger. This position allows convenient storage of the tow bar or the front forks and allows the operation of the trailer/jogger combination with out significant interference of the stored component with the operation of the trailer/jogger in either of its configurations.

Figure 5:
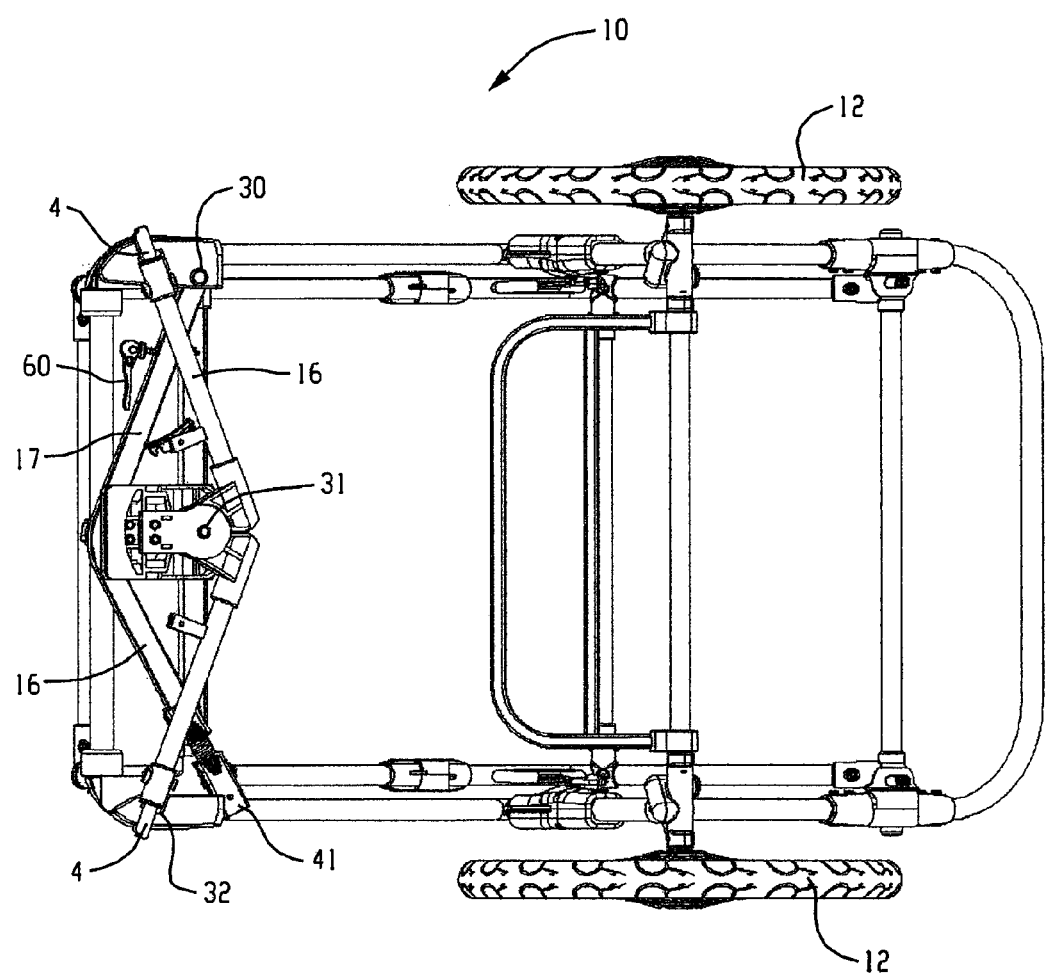
FIG. 5 is a bottom view of an embodiment of the trailer/jogger combination wherein both the tow bar and the front forks are in the stored position.
Figure 6A:
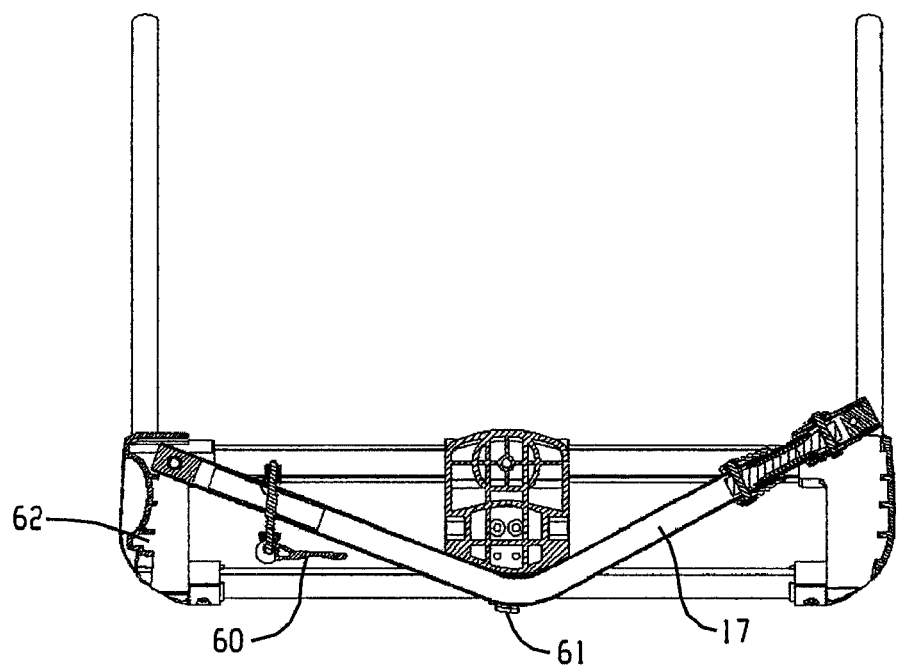
FIGS. 6A through 6D show an embodiment of the trailer/jogger combination wherein the tow bar is in the stored position (FIG. 6A), the in-use position (FIG. 6D) and two intermediate positions (FIGS. 6B and 6C)
Figure 6B:
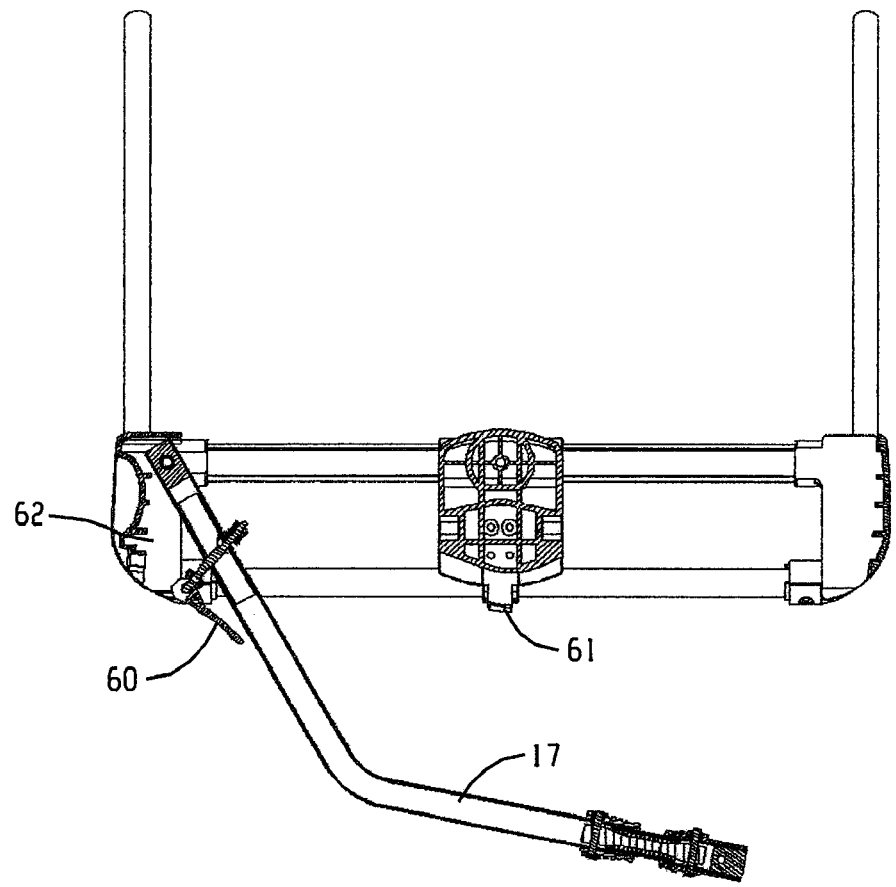
Figure 6C:
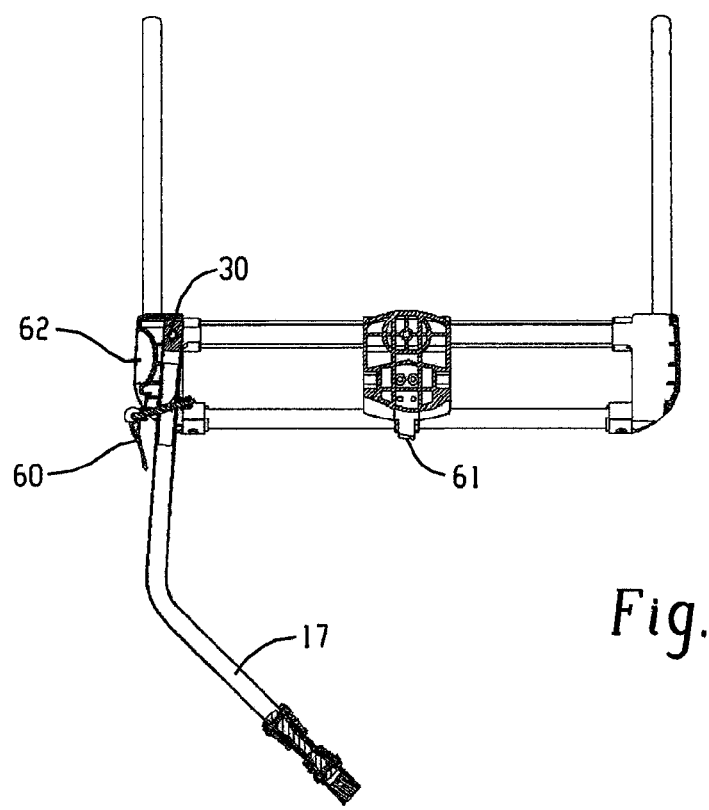
Figure 6D:
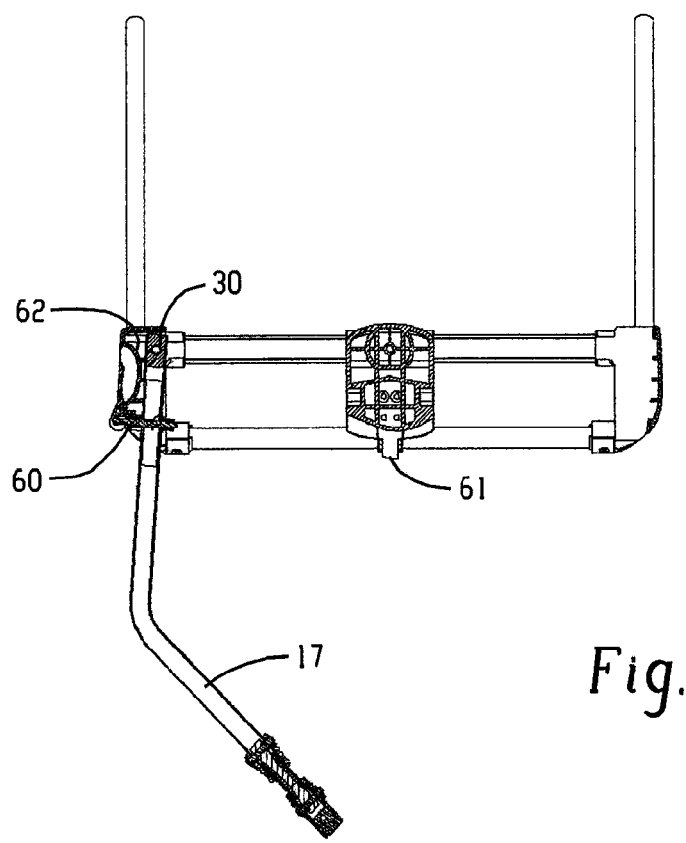

FIG. 5 shows trailer/jogger 10 wherein both the front forks 16 and the tow bar 17 are in the stored position. In FIGS. 6A through 6B, the tow bar 17 is shown in various positions from a stored position, FIG. 6A, to an in-use position, FIG. 6D, with two intermediate positions shown in FIGS. 6B and 6C. In FIG. 6A, tow bar 17 is held in the stored position by tab 62 connected underneath frame 13. Locking mechanism 60 is capable of locking the tow bar in the in-use position, in the embodiment of FIG. 6D, locking mechanism 60 is rotated to its locked position holding the tow bar in the in-use position by interacting with frame component 62.

Figure 7A:
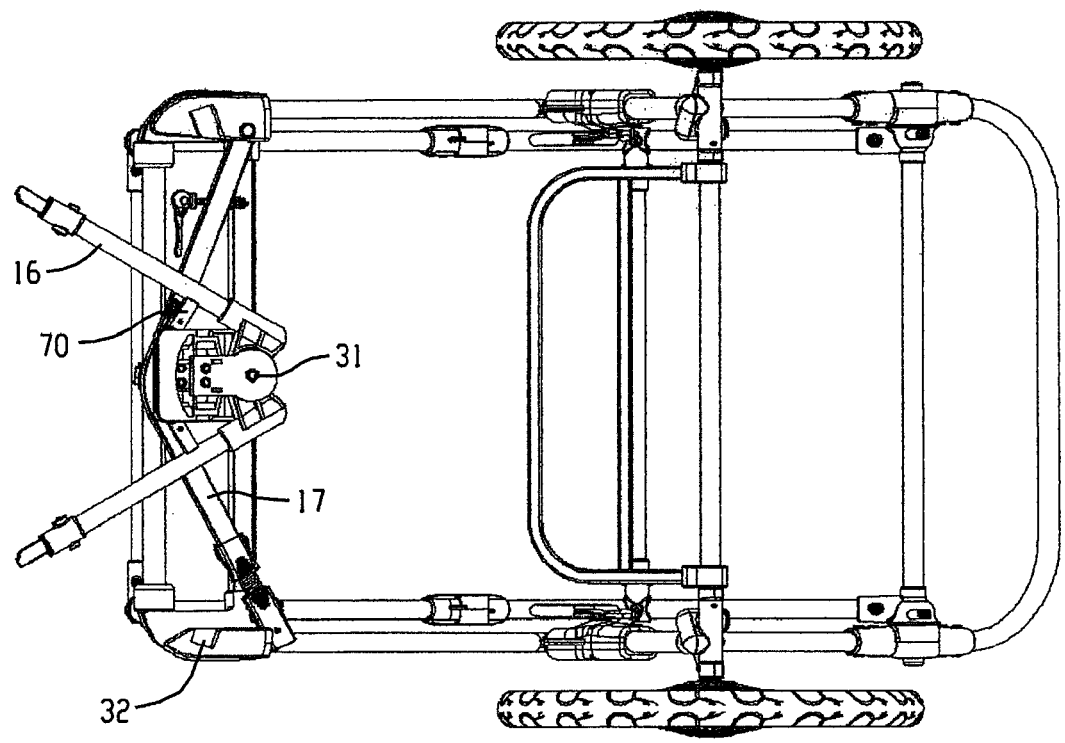
FIGS. 7A and 7B show an embodiment of the trailer/jogger combination wherein the front forks are in a stored position (FIG. 7B) and an intermediate position (FIG. 7A)
Figure 7B:
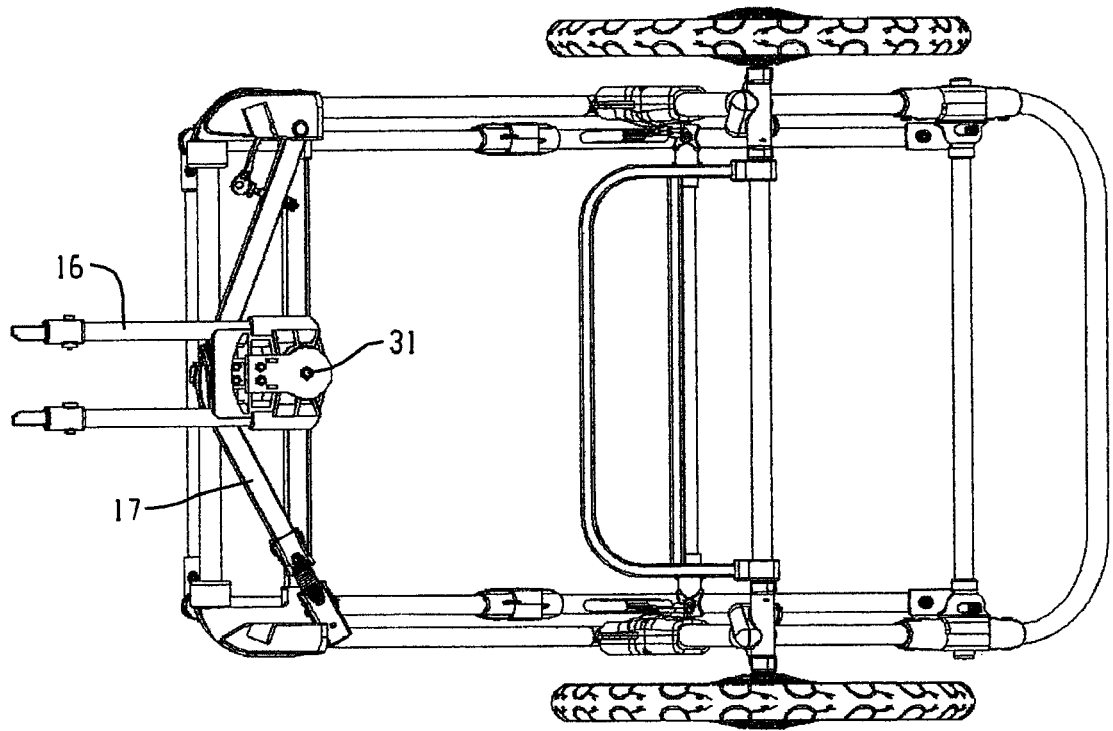

In FIGS. 7A through BB, the front forks 16 are shown in an in-use position, FIG. 7B, and an intermediate position between the in-use position and the stored position, FIG. 7A.

The front fork or front forks and the tow bar may be permanently connected to the frame. As used herein, "permanently connected" means that the component is connected in such a manner that it remains on the article during normal use of either configuration of the trailer/jogger. The component may be removed for maintenance, replacement, upgrading, cleaning, reducing weight, or for other reasons, however, it typically remains on the trailer/jogger under normal use, storage or transportation of the trailer/jogger in either configuration. In specific applications, the permanently attached component may be permanently rotatably attached to allow the component to be moved from a stored position to an in-use position. The term "permanently attached" does not indicate or imply that the component is difficult to remove or requires special tools or skills, only that it does not need to be removed to switch the trailer/jogger from one configuration to another configuration. A permanent connection may be any type of connection, for example, connected in a fixed position, rotatably connected, telescopically connected, or slidably connected to the frame are types of permanent connections. As used herein, the phrase "permanently and rotatably connected" means that during normal use the component that is permanently connected and may be rotated from one position to another. A component may be permanently connected in this sense, for example, if it is connected by bolt, ball joint, screw, friction connection, keyed connection, rod and cotter pin, a combination of such connections, or any other traditional connection that may be removed.

In the embodiment shown in the figures, the trailer/jogger shows both left and right side folding assemblies 14 have the same construction, however, an embodiments of the trailer/jogger may comprise only one folding assembly 14. Each of the left and right rear wheel supports 30 supports an inwardly extending lever 34, which has a predominantly vertical orientation, as shown in FIG. 3, when the frame 12 of the stroller 10 is locked in the fully unfolded position. To begin the procedure to fold the frame 12, each of the handles 15 are pulled to thereby put the folding assemblies 14 in an unlocked state as further explained below.

Figure 8:
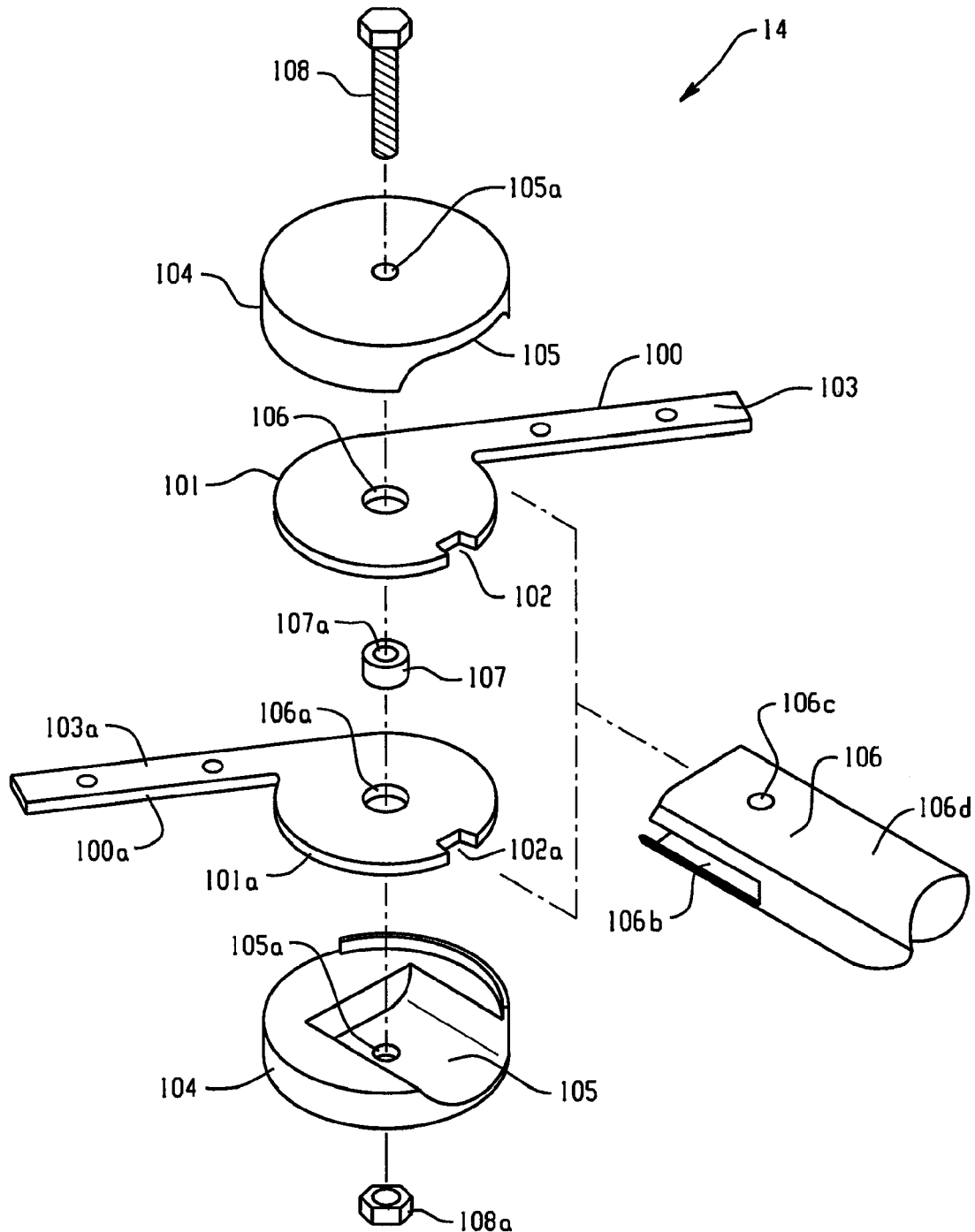
FIGS. 8 through 10 show an embodiment of the folding mechanism of the trailer/jogger.
Figure 9:
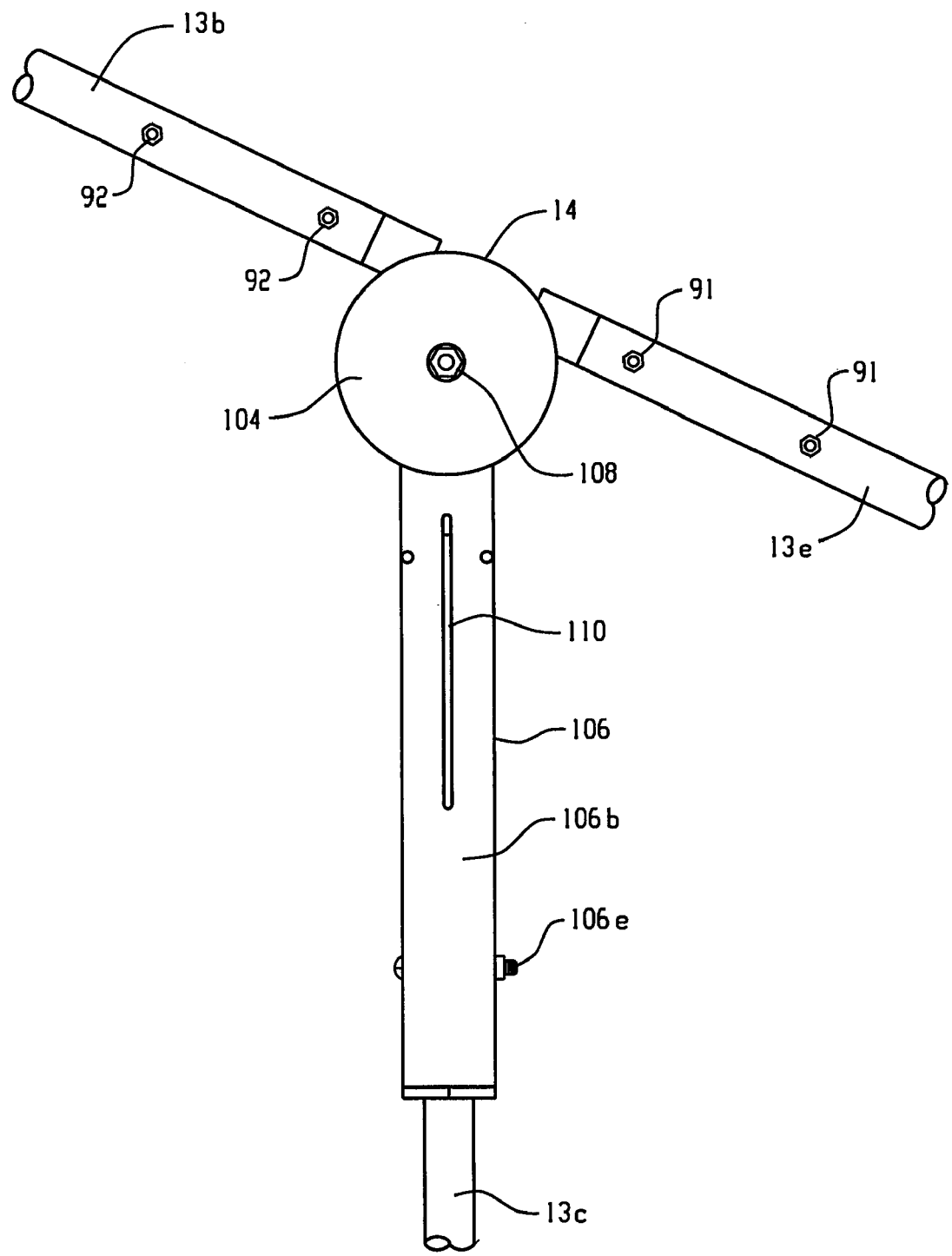
Figure 10:
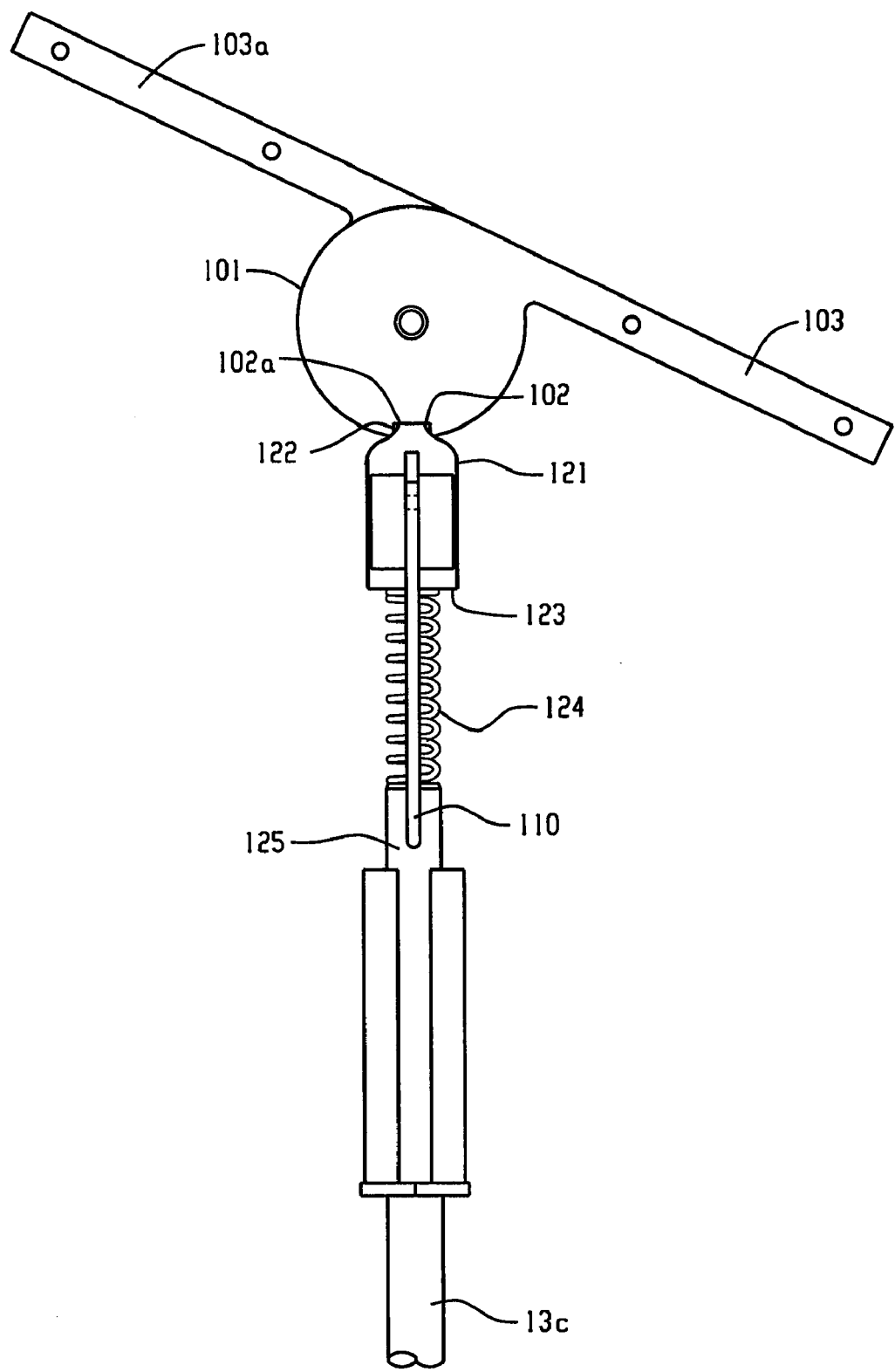

As shown in FIG. 8, each of the folding assemblies 14 includes a forward rotatable member 100 having a disk 101 with a notch 102 and an arm 103, and a rearward rotatable member 100a having a disk 101a with a notch 102a and an arm 103a. The disks 101 and 101a and the arms 103 and 102a are depicted in FIG. 10 as being part of a single formed piece; however, in other implementations the disks and arms are individual pieces that may be fixedly attached together. The rotatable members 100 and 100a, along with a corresponding one of the rear wheel supports 13c, are contained between left and right slotted halves of a housing 104 that allow the arms 103 and 103a to protrude outside of the housing. The inside wall of each half of the housing 104 has recess 105 sized and shaped such that when the two halves of the housing are positioned together, the recesses form a cavity to securely receive the upper free-end portion of the rear wheel support 106 therein. The disks 101 and 101a each have a central aperture 106 and 106a, respectively, sized to receive a bushing 107 therethrough having a length longer than the cumulative thickness of the two disks. When the folding assembly 14 is assembled, the disks 101 and 101a are arranged facing each other with the bushing 107 extending through the aligned apertures 106 and 106a of the disks, and this subassembly is positioned in a slot 106b in the enlarged, upper free-end portion of the real wheel support 106. The slot 106b has a forward to rearward orientation. A central aperture 107a of the bushing 107 is aligned with a pair of opposing inward and outward side apertures 106c of the rear wheel support 106, transverse to the orientation of the slot 106b, and the left and right slotted halves of the housing 104 clamp around the slotted upper free-end portion of the rear wheel support 106. The left and right slotted halves of the housing 104 have opposing apertures 105a, which align with the central aperture 107a of the bushing 107, such that a bolt 108 extends fully through the apertures 105a of the halves of the housing 104, through the aperture 106c of the rear wheel support 106, and through the central aperture 107a of the bushing 107. A nut 100a is threaded onto the threaded end of the bolt 108 to hold the assembly together with the disks 101 and 101a freely rotatable on the bushing 107. With this assembly, the bolt 108 and nut 108a hold the left and right slotted halves of the housing 104 securely clamped together with the slots of the housing having the arms 103 and 103a extending therethrough. The arm 103 extends forwardly through the forward opening of the slot 106b and the other arm 103a extends rearwardly through the rearward opening of the slot 106b in the rear wheel support 106.

When the folding assemblies 14 are in a fully unfolded state, as shown in FIG. 9, the disks 101 and 101a of the folding assembly are locked in place by components positioned internal to the rear wheel supports 106 including a slidably mounted head 121 with a tip 122 inserted into the notches 102 and 102a as shown in FIG. 10. In FIG. 9, a cover portion 106b of the upper free-end portion of the rear wheel support 106 is shown removed in order to better illustrate the components of the folding assembly 14 contained therein. The cover portion 106d is attached to the other portion of the free-end portion of the rear wheel support 106 by a bolt 106e, as seen in FIG. 9. The lever 110 is pivotally mounted to the rear wheel support 106 and the head 121 is mechanically linked to the lever 110 so that when the lever 110 is pulled, head 121 is moved away from the disks 101 and 101a, thereby causing the tip 122 to be retracted and disengaged from the notches 102 and 102a. The disks 101 and 101a are then free to rotate on the bolt 108 and hence allow folding of the front wheel support 13e and the handle support 13b about the rear wheel support 13c in a clam shell movement, as will be explained in greater detail below.

The head 121 further includes a base 123, which rests against one end of a spring 124. The other end of the spring 124 rests against an internal support 125 inside the rear wheel support 13c such that the spring provides a force adequate to bias the tip 125 into an engaged state within the notches 102 and 102a of the disks 101 and 101a when the folding assembly 14 is in the fully unfolded state. While supplying a force to the head 121 to keep the tip 122 in the notches 102 and 102a, the force is not so great as to require undue force to be applied to the lever 116 by the user to retract and disengage the tip from the notches when the folding assembly is to be folded.

Figure 11:
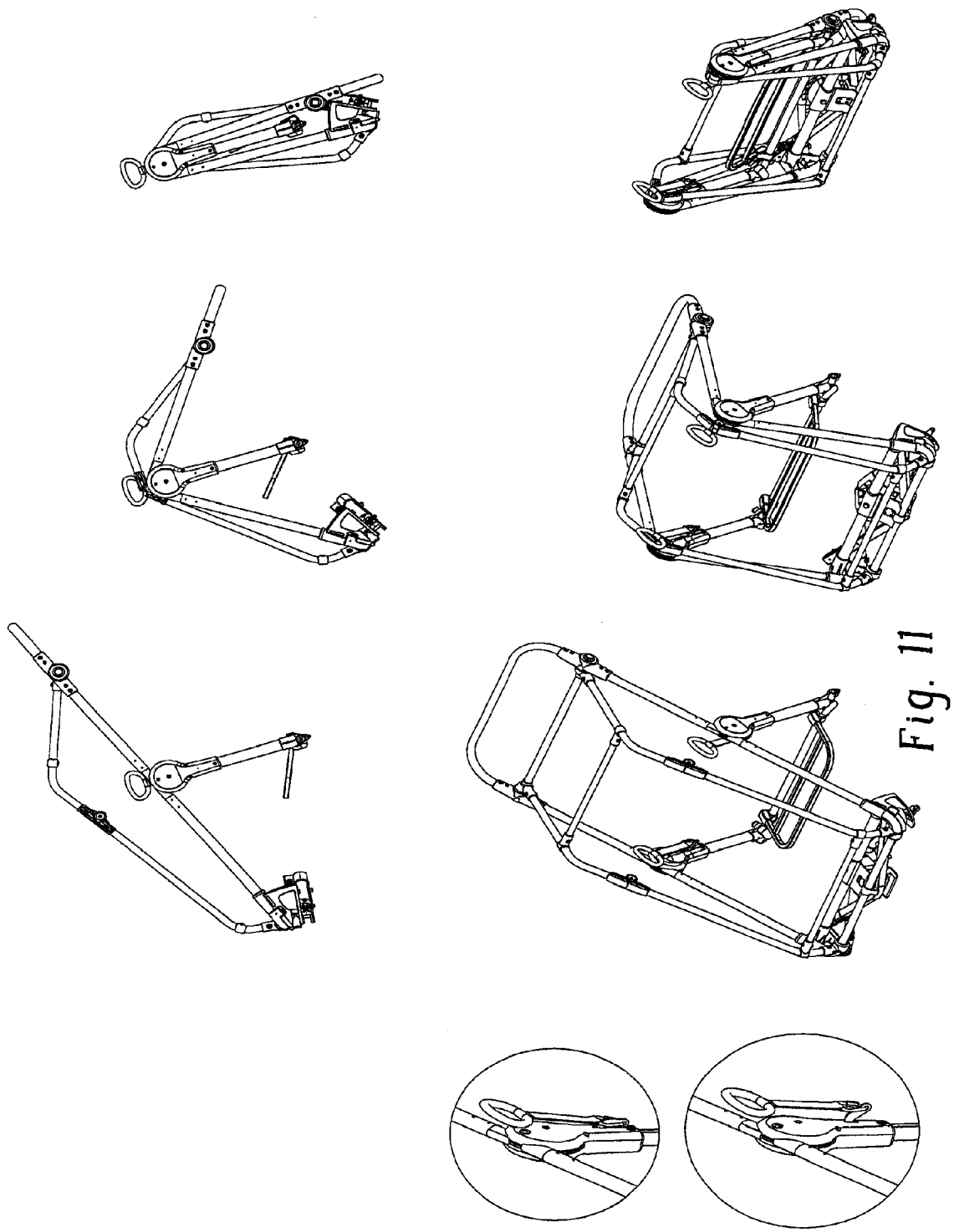
FIG. 11 shows an embodiment of the trailer/jogger in various states from an in-use position to a folded position.

The internal support 125 is coupled to or may be an integral part of the rearward free-end 106a of the rear wheel support 13c to couple the folding assembly 14 to the rear axle assembly. An embodiment of the trailer/jogger is shown in various stages from an in-use position to a folded position in FIG. 11.

From the foregoing it will be appreciated that, although specific embodiments of the invention have been described herein for purposes of illustration, various modifications may be made without deviating from the spirit and scope of the invention. For instance, the depicted implementation used the bolt 108 and nut 108a assembly to rotatably couple the forward rotatable member 100 and the rearward rotatable member 100a together with a corresponding one of the rear wheel supports 13c. In other implementations, pivot members other than the bolt-nut assembly may be used, including pin assemblies. As another example, in the depicted implementation, the rear wheel supports 13c supported the bolt 108 on which the rotatable members 100 and 101 where rotably mounted. In other implementations, either the front wheel support 13e can support the bolt 108 and have the rotatable members 100 and 101 rotatably mounted thereon with the arms 103 and 103a each fixedly attached to one of the handle support 13b and the rear wheel support 13c such that the handle support and the rear wheel support fold about the front wheel support, or the handle support 13b can support the bolt 108 and have the rotatable members 100 and 100a rotatably mounted thereon with the arms 103 and 103a each fixedly attached to one of the front wheel supports 13e and the rear wheel support 13c such that the front wheel support and the real wheel support fold about the handle support. As a further example, the rotatable members 100 and 100a were depicted as including the disks 101 and 101a, however, in other implementations the rotatable members 100 and 100a may have other shapes. As an additional example, the depicted implementation aligned the tip 122 of the spring loaded head 121 of each folding assembly 14 with the notches 102 and 102a of the disks 101 and 101a to secure the stroller 10 into the fully folded state. In other implementations, each folding assemblies 14 can use a pin or other member that is inserted into holes in each of the disks 101 and 101a to hold the front wheel supports 13e, the handle supports 13b, and the rear wheel supports 13c in the unfolded state. Accordingly, the invention is not limited except as by the appended claims.

Embodiments of method include methods of converting a trailer to a jogging stroller. To be used as a jogging stroller, the method comprises rotating at least one fork from a stored position underneath the frame and locking the front forks together with a locking mechanism such as a latch. A preferred embodiment of the method includes two front forks. This allows a third wheel to be secured between the front forks. Once the front wheel is attached, a brake mechanism may optionally be secured to the front wheel and activated.

It should be noted that the forks and brake system are attached to the frame at all times, and that the third wheel may be stored in a back pocket compartment when not in-use or rotated to a stored position.

While the present invention resides mainly in the ability to convert from a stroller/jogger configuration to a trailer configuration without the need of a conversion kit, the follow description includes discussion of the main elements of the stroller/jogger/trailer, save for the specifics of the conversion elements and systems described above.

One of the benefits of the present design is that keeping everything on the trailer is much more convenient than taking the pieces on and off. Everything is preferably stored under the front end of the trailer for easy access.

It will be understood by those of skill in the art that strength and durability of the front jogger forks and tow bar must be such that they may safely carry the desired load in some embodiments, as they must be able to hold up under the stress of normal use with up to 100 lbs in the trailer.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A stroller, comprising:
a frame;
two front forks rotatably connected to the frame, wherein the two front forks comprise at least two separate rotatable components; and
a tow bar attached to the frame, wherein the front fork and the tow bar are selectively capable of being moved from an in-use position to a storage position.

2. The stroller of claim 1, wherein the front forks may be rotated from an in-use position to a stored position.

3. The stroller of claim 2, wherein the stored position is underneath the frame.

4. The stroller of claim 1, wherein the tow bar is rotatably secured to the frame.

5. The stroller of claim 4, wherein the tow bar may be rotated from an in-use position to a stored position.

6. The stroller of claim 5, wherein the stored position is underneath the frame.

7. The stroller of claim 1, wherein the two front forks and the tow bar are permanently connected to the frame.

8. The stroller of claim 7, wherein the permanent connection of the tow bar is at least one of rotatably or slidably connected to the frame.

9. The stroller of claim 1, wherein a wheel is attached to the two front forks.

10. The stroller of claim 9, wherein the wheel is releasably attached to the front fork.

11. The stroller of claim 1, wherein the two front forks are rotatably and permanently attached to the frame.

12. A method of converting a stroller to a trailer, comprising:
removing a wheel;
rotating two front forks underneath the frame; and
rotating a tow bar from underneath the frame.

13. The method of claim 12, comprising:
locking the tow bar in place.

14. A combination stroller/trailer, comprising:
a front fork rotatably connected to a stroller frame by a first connector; and
a tow bar rotatably connected to the stroller frame by a second connector, wherein the second connector comprises a lock for locking the front fork in a stored position.

15. The combination stroller/trailer of claim 14, comprising a second fork attached to the first connector.

16. The combination stroller/trailer of claim 14, wherein the front fork and the tow bar are permanently connected to the frame.

17. A combination stroller/trailer, comprising:
a first front fork and a second front fork rotatably connected to a stroller frame by a first connector; and
a tow bar rotatably connected to the stroller frame by a second connector wherein both the first and second forks are capable of being connected together to lock the front forks in the in-use position and capable of being independently rotated underneath the frame where at least a portion of the fork is engaged in a recess to hold the front fork in the stored position.

18. A stroller, comprising:
a front fork attached to a frame, wherein the front fork comprises at least two separate rotatable components;
wherein the at least rotatable components may be independently rotated from an in-use position to a stored position; and
a tow bar attached to the frame.

* * * * *